United States Patent
Okamoto et al.

(10) Patent No.: US 11,840,015 B2
(45) Date of Patent: Dec. 12, 2023

(54) COMPOSITION FOR OPTICAL THREE-DIMENSIONAL SHAPING, THREE-DIMENSIONALLY SHAPED ARTICLE, AND METHOD FOR PRODUCING SAME

(71) Applicant: OKAMOTO CHEMICAL INDUSTRY CO., LTD., Warabi (JP)

(72) Inventors: Hiroaki Okamoto, Warabi (JP); Masaro Nakatsuka, Warabi (JP)

(73) Assignee: Okamoto Chemical Industry Co., Ltd., Warabi (JP)

( * ) Notice: Subject to any disclaimer, the term of this patent is extended or adjusted under 35 U.S.C. 154(b) by 559 days.

(21) Appl. No.: 16/972,438

(22) PCT Filed: Jan. 21, 2019

(86) PCT No.: PCT/JP2019/001720
§ 371 (c)(1),
(2) Date: Dec. 4, 2020

(87) PCT Pub. No.: WO2020/136919
PCT Pub. Date: Jul. 2, 2020

(65) Prior Publication Data
US 2021/0229344 A1 Jul. 29, 2021

(30) Foreign Application Priority Data
Dec. 25, 2018 (JP) .................. 2018-241327

(51) Int. Cl.
*B29C 64/124* (2017.01)
*B33Y 70/00* (2020.01)
*B29C 64/264* (2017.01)
*C08F 220/34* (2006.01)
*C08F 222/10* (2006.01)
*C08F 220/28* (2006.01)
*C08F 2/50* (2006.01)
*B33Y 10/00* (2015.01)
*B33Y 80/00* (2015.01)

(52) U.S. Cl.
CPC .......... *B29C 64/124* (2017.08); *B29C 64/264* (2017.08); *B33Y 70/00* (2014.12); *C08F 2/50* (2013.01); *C08F 220/282* (2020.02); *C08F 220/346* (2020.02); *C08F 222/102* (2020.02); *C08F 222/104* (2020.02); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 2003/0149127 A1* | 8/2003 | Jansen | C03C 25/106 522/178 |
| 2006/0141276 A1* | 6/2006 | Ito | B33Y 70/00 428/500 |
| 2012/0251829 A1 | 10/2012 | Xu et al. | |
| 2016/0324730 A1* | 11/2016 | Lee | A61C 13/0004 |
| 2017/0120416 A1* | 5/2017 | Chockalingam | B33Y 80/00 |
| 2019/0161573 A1* | 5/2019 | Okada | B33Y 70/00 |

FOREIGN PATENT DOCUMENTS

| | | |
|---|---|---|
| CN | 107312136 A | 11/2017 |
| JP | 08059759 A | 3/1996 |
| JP | 11228804 A | 8/1999 |
| JP | 2008260812 A | 10/2008 |
| JP | 2010260917 A | 11/2010 |
| JP | 2013023574 A | 2/2013 |
| JP | 2013514213 4 | 4/2013 |
| JP | 2016196135 A | 11/2016 |
| JP | 2018048312 A | 3/2018 |
| JP | 2018154717 A | 10/2018 |

OTHER PUBLICATIONS

"International Search Report corresponding to International Application No. PCT/JP2019/001720 dated Mar. 19, 2019".

* cited by examiner

*Primary Examiner* — Yung-Sheng M Tsui
(74) *Attorney, Agent, or Firm* — Myers Bigel, P.A.

(57) ABSTRACT

Provided is a composition for optical stereolithography the stereolithography (photocuring) of which is completed in a shorter time and which provides a stereolithographic object having excellent strength (for example, strength that prevents the occurrence of a fracture and the like when the stereolithographic object is subjected to an impact or dropping, and strength that allows the stereolithographic object to withstand repeated folding). The composition for optical stereolithography of the present invention includes at least 2 to 40% by mass of (A1) a radical polymerizable compound of a dioxane (meth)acrylate, 5 to 40% by mass of (A2) a radical polymerizable compound of a bifunctional polyester-based urethane (meth)acrylate, 5 to 40% by mass of (A3) a radical polymerizable compound of a bifunctional polyether-based urethane (meth)acrylate, and 20 to 87% by weight of (A4) a radical polymerizable compound other than the (A1), (A2), and (A3), as (A) radical polymerizable compounds; 0.1 to 5% by mass of (B) a photopolymerization initiator; and 0.1 to 5% by mass of (C) a sensitizer.

3 Claims, No Drawings

COMPOSITION FOR OPTICAL THREE-DIMENSIONAL SHAPING, THREE-DIMENSIONALLY SHAPED ARTICLE, AND METHOD FOR PRODUCING SAME

RELATED APPLICATIONS

This application is a 35 U.S.C. § 371 national phase application of PCT Application PCT/JP2019/001720 filed Jan. 21, 2019, which claims priority to Japanese Application No. 2018-241327 filed Dec. 25, 2018. The entire contents of each are incorporated herein by reference in its entirety.

FIELD OF THE INVENTION

The present invention relates to a composition for optical stereolithography, to a stereolithographic object, and to a method for producing the same.

BACKGROUND OF THE INVENTION

Recently, optical stereolithographic techniques have attracted attention for the fabrication of a stereolithographic object based on three-dimensional CAD data by stacking cured layers one by one which are formed by curing a photocurable resin using ultraviolet laser scanning. According to the optical stereolithographic technique ("optical stereolithography" is also hereinafter referred to as "stereolithography"), a prototype can be fabricated simply and quickly without having to provide a die or a mold, and therefore, the time and cost required from design in product development to production can be reduced. Along with the rapid spread of three-dimensional CAD, the stereolithographic technique has been adopted in a wide range of industrial fields such as automobile parts, electrical equipment, and medical equipment.

Due to the expansion of the fields in which optical stereolithographic techniques are being applied, performance required of photocurable resins has also increased. In particular, photocurable resins are required that have a fast curing rate, are excellent in dimensional stability and dimensional accuracy when cured, and can form stereolithographic objects with excellent mechanical characteristics such as toughness and durability and heat resistance that are less likely to break even if external stress such as bending is applied. For example, it is described that a photocurable resin that does not cause warping of a substrate film or a crack in a coating film when irradiated with an active energy ray to make the coating film was obtained by containing a (meth)acrylate of a polyglycerin alkylene oxide adduct (number of moles added: 50 to 200) as a raw material of the photocurable resin (Patent Document 1).

In addition, with the progress of the stereolithographic technique, photocurable resins that can be used in applications in which higher heat resistance is needed, for example, stereolithographic objects used for engine portions, are required. For example, compositions in which a particular cationically polymerizable organic substance or a particular compound having two oxetanyl groups is blended are proposed (Patent Document 2, Patent Document 3, and Patent Document 4).

REFERENCE DOCUMENT LIST

Patent Documents

Patent Document 1: JP 2010-260917 A
Patent Document 2: JP H11-228804 A
Patent Document 3: JP 2008-260812 A
Patent Document 4: JP 2013-023574 A

SUMMARY OF THE INVENTION

Problem to be Solved by the Invention

Commercial stereolithographic objects produced by stereolithography often have a complicated shape and must adapt to applications in which force is applied, they are bent, and heat is applied. However, generally, in the production of a stereolithographic object, the stereolithographic object is produced by stacking thin cured film layers about 20 to 100 microns thick formed by scanning a stereolithographic composition with an ultraviolet laser, and at this time, the strength of the stereolithographic object may be affected unless the thin cured film layers adhere closely to each other. Furthermore, a problem of conventional stereolithographic compositions is that a stereolithographic object may warp and be caught by an ultraviolet laser scanner during production.

In addition, as described in Patent Document 2, in order to improve the heat resistance of a stereolithographic object, after a composition is cured by light irradiation, further ultraviolet irradiation treatment and heat treatment are generally performed, but even if such ultraviolet irradiation treatment is performed, satisfactory strength (for example, strength that prevents the occurrence of a fracture and the like when the stereolithographic object is subjected to an impact, or is dropped) has not yet been provided.

Furthermore, as described in Patent Document 2, in order to improve the heat resistance of a stereolithographic object, after a composition is cured by light irradiation, further heating, for example, at 60 to 250° C. is generally performed, but when heat treatment is performed in this manner, the number of steps increases, and therefore, the work efficiency may decrease.

Accordingly, in view of the above problems, it is an object of the present invention to provide a composition for optical stereolithography comprising a water-insoluble radical polymerizable component, the stereolithography (photocuring) of which is completed in a shorter time and which provides a stereolithographic object having excellent strength (strength that prevents the occurrence of a fracture and the like when the stereolithographic object is subjected to an impact, or is dropped, and strength with which the stereolithographic object can withstand repeated folding) by being subjected to ultraviolet irradiation treatment after stereolithography, a stereolithographic object thereof, and a method for producing a stereolithographic object.

Means for Solving the Problem

In order to achieve the above object, one aspect of the present invention is a composition for optical stereolithography which includes at least: (A1) a radical polymerizable compound of a dioxane (meth)acrylate, (A2) a radical polymerizable compound of a bifunctional polyester-based urethane (meth)acrylate, (A3) a radical polymerizable compound of a bifunctional polyether-based urethane (meth)acrylate, and (A4) a radical polymerizable compound other than the (A1), (A2), and (A3), as (A) radical polymerizable compounds; (B) a photopolymerization initiator; and (C) a sensitizer, wherein a content of the (A1) radical polymerizable compound is 2 to 40% by mass, a content of the (A2) radical polymerizable compound is 5 to 40% by mass, a content of the (A3) radical polymerizable compound is 5 to 40% by mass, a content of the (A4) radical polymerizable compound is 20 to 87% by weight, a content of the (B) photopolymerization initiator is 0.1 to 5% by mass, and a content of the (C) sensitizer is 0.1 to 5% by mass.

Another aspect of the present invention is a method for producing a stereolithographic object, including at least a step of irradiating the above-described composition for optical stereolithography with an active energy ray to cure the composition for optical stereolithography.

Yet another aspect of the present invention is a stereolithographic object including a cured product of the above-described composition for optical stereolithography.

Effects of the Invention

According to the present invention, it is possible to provide a composition for optical stereolithography that can shorten photocuring time in producing a stereolithographic object and can produce a stereolithographic object having excellent strength (strength that prevents the occurrence of a fracture and the like when the stereolithographic object is subjected to an impact, or dropping, and strength with flexibility with which the stereolithographic object can withstand repeated folding) by being subjected to ultraviolet irradiation treatment after photocuring. In addition, when this composition for optical stereolithography is used, cured layer films adhere closely to each other in the production process of a stereolithographic object, and therefore, warp deformation decreases, and furthermore, the adhesion between the layers is good, and therefore, a stereolithographic object having high strength (for example, bending strength, tensile strength, bending modulus, and repeated bending strength) can be obtained.

MODE FOR CARRYING OUT THE INVENTION

One embodiment of each of a composition for optical stereolithography, a stereolithographic object thereof, and a method for producing a stereolithographic object according to the present invention will be described below, but the scope of the present invention is not limited to this mode.

The composition for optical stereolithography of the embodiment contains at least components (A) to (C), the details of which will be described below, and further contains other components as needed.

The component (A) is radical polymerizable compounds and further, comprises four components, the following components (A1) to (A4). The component (A1) is a dioxane (meth)acrylate having a methacrylic group and/or an acrylic group. The component (A2) is a bifunctional polyester-based urethane (meth)acrylate having a methacrylic group and/or an acrylic group. The component (A3) is a bifunctional polyether-based urethane (meth)acrylate having a methacrylic group and/or an acrylic group. The component (A4) is a radical polymerizable compound other than the above components (At), (A2), and (A3). By adding the radical polymerizable compounds, the component (A1), the component (A2), and the component (A3), to the composition for optical stereolithography, mechanical strength and flexibility can be provided, and a cured product that has strong tensile strength and is less likely to break is obtained.

Specific examples of the dioxane (meth)acrylate having a methacrylic group and/or an acrylic group, the component (A1), include dioxane glycol (meth)acrylate and (2-oxo-1, 3-dioxolan-4-yl)methyl methacrylate.

The dioxane (meth)acrylate having a methacrylic group and/or an acrylic group, the component (A1), may be synthesized by a known method, and in addition a commercial one may be used. Examples thereof include KAYARDA R-604 manufactured by Nippon Kayaku Co., Ltd., and NK Ester A-DOG manufactured by Shin Nakamura Chemical Co., Ltd.

The content of the dioxane (meth)acrylate having a methacrylic group and/or an acrylic group, the component (A1), is in the range of 2 to 40% by mass, preferably in the range of 10 to 30% by mass, in the composition for optical stereolithography. When the content of the component (A1) is less than 2% by mass, curing is slow, and a stereolithographic object is brittle when formed. When the content is more than 40% by mass, curing is too fast, and the close adhesion of thin cured film layers to each other worsens, and the strength of the stereolithographic object decreases.

Specific examples of the bifunctional polyester-based urethane (meth)acrylate having a methacrylic group and/or an acrylic group, the component (A2), include the reaction product of a polyester polyol, a bifunctional isocyanate compound, and a hydroxy-containing monofunctional (meth)acrylate. Specific examples of the bifunctional isocyanate compound include, but are not limited to, tolylene diisocyanate, diphenylmethane diisocyanate, hexamethylene diisocyanate, and isophorone diisocyanate. Specific examples of the monofunctional (meth)acrylate include, but are not limited to, hydroxyethyl acrylate, hydroxyethyl methacrylate, and hydroxypropyl acrylate.

The bifunctional polyester-based urethane (meth)acrylate having a methacrylic group and/or an acrylic group, the component (A2), may be synthesized by a known method, and in addition, a commercial one may be used. Examples thereof include NK OLIGO series UA-122P, U-200PA, and UA-4400 manufactured by Shin Nakamura Chemical Co., Ltd., Hi-Cope AU-2040 manufactured by TOKUSHIKI Co., Ltd., KAYARAD UX Series UX-3204, UX-4101, UXT-6100, and UX-8101 manufactured by Nippon Kayaku Co., Ltd., and RUA-074 manufactured by ASIA INDUSTRY CO., LTD.

The content of the bifunctional polyester-based urethane (meth)acrylate having a methacrylic group and/or an acrylic group, the component (A2), is in the range of 5 to 40% by mass, preferably in the range of 10 to 30% by mass, in the composition for optical stereolithography. When the content of the component (A2) is less than 5% by mass, the flexibility and the tenacity (breaking strength) are insufficient. When the content is more than 40% by mass, the tensile strength disappears when a stereolithographic object is formed.

Specific examples of the bifunctional polyether-based urethane (meth)acrylate having a methacrylic group and/or an acrylic group, the component (A3), include the reaction product of a polyether polyol, a bifunctional isocyanate compound, and a hydroxy-containing monofunctional (meth)acrylate. Specific examples of the bifunctional isocyanate compound include, but are not limited to, tolylene diisocyanate, diphenylmethane diisocyanate, hexamethylene diisocyanate, and isophorone diisocyanate. Specific examples of the monofunctional (meth)acrylate include, but are not limited to, hydroxyethyl acrylate, hydroxyethyl methacrylate, and hydroxypropyl acrylate.

The bifunctional polyether-based urethane (meth)acrylate having a methacrylic group and/or an acrylic group, the component (A3), may be synthesized by a known method, and in addition a commercial one may be used. Examples thereof include UA-160™, UA-290™, and UA-4200 manufactured by Shin Nakamura Chemical Co., Ltd., Hi-Cope AU-2090 manufactured by TOKUSHIKI Co., Ltd., UX-0930, UXF-4002, and UX-6101 manufactured by Nippon Kayaku Co., Ltd., SUA-008 and SUA-023 manufactured by ASIA INDUSTRY CO., LTD., and KUA-PEA2I, KUA-PEB2I, and KUA-PE2C1 manufactured by KSM CO., LTD.

The content of the bifunctional polyether-based urethane (meth)acrylate having a methacrylic group and/or an acrylic group, the component (A3), is in the range of 5 to 40% by mass, preferably in the range of 10 to 30% by mass, in the composition for optical stereolithography. When the content of the component (A3) is less than 5%, the rubber elasticity and the tensile strength are insufficient. When the content is more than 40%, a stereolithographic object is too soft when formed.

The radical polymerizable compound, the component (A4), is a radical polymerizable compound other than the above components (A1), (A2), and (A3) and has a methacrylic group and/or an acrylic group. The content of this radical polymerizable compound, the component (A4), is in the range of 20 to 87% by mass, preferably in the range of 20 to 70% by mass, in the composition for optical stereolithography.

Specific examples of a monofunctional monomer of the radical polymerizable compound, the component (A4), may include (meth)acryloylmorpholine, 2-hydroxyethyl (meth)acrylate, 2-hydroxylpropyl (meth)acrylate, polyethylene glycol mono(meth)acrylate, glycerin (meth)acrylate, nonylphenol EO-modified (meth)acrylate, the reaction product of 2-hydroxylethyl (meth)acrylate and phosphoric anhydride, the reaction product of a hexalide addition polymer of 2-hydroxylethyl (meth)acrylate and phosphoric anhydride, acrylamide, 7-amino-3,7-dimethyloctyl (meth)acrylate, isobutoxymethyl(meth)acrylamide, isobornyl (meth)acrylate, 2-ethylhexyl (meth)acrylate, diacetone (meth)acrylamide, dimethylaminoethyl (meth)acrylate, diethylaminoethyl (meth)acrylate, lauryl (meth)acrylate, dicyclopentenyloxyethyl (meth)acrylate, dicyclopentenyl (meth)acrylate, N,N-dimethyl(meth)acrylamide, tetrahydrofurfuryl (meth)acrylate, vinylcaprolactam, N-vinylpyrrolidone, phenoxyethyl (meth)acrylate, butoxyethyl (meth)acrylate, pentachlorophenyl (meth)acrylate, pentabromophenyl (meth)acrylate, polyethylene glycol mono(meth)acrylate, and isobornyl (meth)acrylate.

Specific examples of a bifunctional monomer of the radical polymerizable compound, the component (A4), may include triethylene glycol di(meth)acrylate, dimethyloltricyclodecane di(meth)acrylate, tetraethylene glycol di(meth)acrylate, polyethylene glycol (400) di(meth)acrylate, polyethylene glycol (600) di(meth)acrylate, polypropylene glycol (400) di(meth)acrylate, ethoxylated (3) bisphenol A di(meth)acrylate, ethoxylated (4) bisphenol A di(meth)acrylate, ethoxylated (10) bisphenol A di(meth)acrylate, ethoxylated (30) bisphenol A di(meth)acrylate, ethoxylated (4) hydrogenated bisphenol A di(meth)acrylate, ethoxylated (30) hydrogenated bisphenol A di(meth)acrylate, EO-modified (10) hydrogenated bisphenol A di(meth)acrylate, ethylene glycol di(meth)acrylate, tricyclodecanediyldimethylene di(meth)acrylate, tripropylene glycol di(meth)acrylate, neopentyl glycol di(meth)acrylate, 1,4-butanediol di(meth)acrylate, 1,6-hexanediol di(meth)acrylate, a neopentyl glycol hydroxypivalate (meth)acrylic acid adduct, caprolactone-modified neopentyl glycol hydroxypivalate di(meth)acrylate, polyester di(meth)acrylates, aliphatic urethane acrylates, aromatic urethane (meth)acrylates, an ester compound of a 6-hexanolide addition polymer (degree of polymerization 1 to 7) of 3-hydroxy-2,2-dimethylpropyl-3-hydroxy-2,2-dimethyl propionate and (meth)acrylic acid, and further, modified acrylic resin (meth)acrylates.

Specific examples of a polyfunctional monomer of the radical polymerizable compound, the component (A4), may include ethoxylated (9) glycerin tri(meth)acrylate, ethoxylated (20) glycerin tri(meth)acrylate, polyether-based trifunctional (meth)acrylates, tris(acryloyloxyethyl) isocyanurate, trimethylolpropane tri(meth)acrylate, EO-modified trimethylolpropane tri(meth)acrylate, PO-modified trimethylolpropane tri(meth)acrylate, pentaerythritol tri(meth)acrylate, dipentaerythritol hexa(meth)acrylate, dipentaerythritol penta(meth)acrylate, ditrimethylolpropane tetra(meth)acrylate, dipentaerythritol monohydroxypenta(meth)acrylate, a (meth)acrylate of ε-caprolactone-modified dipentaerythritol, polyether-based urethane trifunctional (meth)acrylates, ethoxylated isocyanuric acid tri(meth)acrylate, an ethylene glycol diglycidyl ether (meth)acrylic acid adduct, a propylene glycol diglycidyl ether (meth)acrylic acid adduct, a tripropylene glycol diglycidyl ether (meth)acrylic acid adduct, a glycerin diglycidyl ether (meth)acrylic acid adduct, a bisphenol A diglycidyl ether (meth)acrylic acid adduct, epoxidized soybean oil acrylates, novolac type epoxy acrylates, polyfunctional aromatic urethane (meth)acrylates, polyfunctional aliphatic urethane (meth)acrylates, polyfunctional polyether-based urethane (meth)acrylates, polyfunctional polyester-based (meth)acrylates, a polyoxyethylene polyglyceryl ether-acrylic acid adduct, and further, modified acrylic resin (meth)acrylates.

The radical polymerizable compound, the component (A4), may be synthesized by a known method, and in addition a commercial one may be used. Examples of the monofunctional monomer include ARONIX M-111 manufactured by TOAGOSEI CO., LTD. Examples of the bifunctional monomer include LIGHT ESTER 4EG and LIGHT ACRYLATE 4EG-A manufactured by Kyoeisha Chemical Co., Ltd. and KAYARAD series HX-220 and HX-620 manufactured by Nippon Kayaku Co., Ltd. Examples of the polyfunctional monomer include ARONIX M-306 manufactured by TOAGOSEI CO., LTD. Examples of the modified acrylic resin (meth)acrylates include SUBARU-501 manufactured by OSAKA ORGANIC CHEMICAL INDUSTRY LTD., BEAMSET 243NS manufactured by Arakawa Chemical Industries, Ltd., HA7975 manufactured by Hitachi Chemical Company, Ltd., ACRIT 8KX-078 manufactured by Taisei Fine Chemical Co., Ltd., and Kuraprene UC203 manufactured by KURARAY CO., LTD.

The component (B) is a photopolymerization initiator, and is not particularly limited as long as it is a compound that can initiate the radical reaction of the radical polymerizable compounds by irradiation with an active energy ray. As the photopolymerization initiator, a radical polymerization initiator or a cationic polymerization initiator may be used.

Specific examples of the radical polymerization initiator may include 2,2-dimethoxy-1,2-diphenylethan-1-one, 1-hydroxycyclohexyl phenyl ketone, 4-(4-methylphenylthio) benzophenone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-[4-[4-(2-hydroxy-2-methyl-propionyl)-benzyl]phenyl-2-methyl-propan-1-one, 2-hydroxy-1-[4-(2-hydroxyethoxy)phenyl]-2-methyl-1-propanone, phenylglyoxylic acid methyl ester, 2-methyl-1-(4-methylthiophenyl)-2-morpholinopropan-1-one, 2-benzyl-dimethylamino-1-(4-morpholinophenyl)butane-1, 2-(dimethylamino)-2-[(4-methylphenyl)methyl]-1-[4-(morpholinyl)phenyl]-1-butane, 2,4,6-trimethylbenzoyl-diphenyl-phosphine oxide, bis(2,4,6-trimethylbenzoyl)-phenylphosphine oxide, 2,4,6- trimethylbenzoylphenylethoxyphosphine oxide, 2-isopropylthioxanthone, 2-ethyl-9,10-anthraquinone, bis(η5-2,4-cyclopentadien-1-yl)-bis(2,6-difluoro-3-(1H-pyrrol-1-yl)-phenyl)titanium, 1,2-octanedione-1-[4-(phenylthio)-2-(o-benzoyloxime)], ethanone,1-[9-ethyl-6-(2-methylbenzoyl)-9H-carbazol-3-yl]-1-(o-acetyloxime), camphorquinone, benzophenone, 2,4-diethylthioxanthon-9-one, 2-hydroxy-2-methyl-1-phenyl-1-propane, 4,4-bis(diethylamino)benzophenone, ethyl 4-(dimethylamino)-benzoate, [4-(methylphenylthio)phenyl]-phenylmethane, ethylhexyl-4-dimethylaminobenzoate, methyl o-benzoylbenzoate, 4-methylbenzophenone, camphorquinone, tetrabutylammonium butyltriphenylborate, tetrabutylammonium butyltrinaphthylborate, 2-ethyl-4-methylimidazolium tetraphenylborate, and 1,5-diazabicyclo[4,3,0]nonene-5-tetraphenylborate. One radical polymerization initiator may be used alone, or two or more radical polymerization initiators may be used in combination.

The radical polymerization initiator may be synthesized by a known method, and in addition a commercial one may be used. Examples thereof include IRGACURE series, DAROCUR series, and LUCIRIN series manufactured by BASF, SB-PI series manufactured by Sort Co., Ltd., ESACURE series manufactured by IGM-RESINS, LUNACURE series manufactured by DKSH Japan, ADEKA OPTOMER series manufactured by ADEKA, organoboron compound series manufactured by Showa Denko K.K., and organoboron compound series manufactured by HOKKO CHEMICAL INDUSTRY CO., LTD.

For the cationic polymerization initiator, a non-antimony-containing cationic polymerization initiator is preferred. The non-antimony-containing cationic polymerization initiator comprises no antimony (Sb) that is a toxic substance, and therefore has high safety for the human body and the environment. In addition, the burden of the treatment of a waste liquid produced in the production process of a stereolithographic object can be reduced. Examples of the non-antimony-containing cationic polymerization initiator include sulfonium compounds or bis(alkylphenyl)iodonium compounds.

Specific examples of the non-antimony-containing cationic polymerization initiator may include bis[4-n-alkyl (C10 to C13) phenyl]iodonium hexafluorophosphate, bis(4-tert-butylphenyl)iodonium bis(perfluorobutanesulfonyl)imide, bis(4-tert-butylphenyl)iodonium hexafluorophosphate, bis[4-n-alkyl (c10 to c13) phenyl]iodonium tetrakis(pentafluorophenyl) borate (wherein c0 to c13 is the number of carbon atoms of the n-alkyl group), diphenyl[4-(phenylthio)phenyl]sulfonium hexafluorophosphate, and 4,4-bis(diphenylsulfonyl)phenyl sulfide bis(hexafluorophosphate), triarylsulfonium hexafluorophosphate, triarylsulfonium tetrakis(pentafluorophenyl) borate, triarylsulfonium special phosphorus-based anion salts, diphenyl(4-methoxyphenyl)sulfonium hexafluorophosphate, diphenyl(4-methoxyphenyl)sulfonium tetrakis(pentafluorophenyl) borate, diphenyl (4-methoxyphenyl)sulfonium special phosphorus-based anion salts, 4-methylphenyldiphenylsulfonium hexafluorophosphate, 4-methylphenyldiphenylsulfonium tetrakis(pentafluorophenyl) borate, 4-methylphenyldiphenylsulfonium special phosphorus-based anion salts, tris(4-methylphenyl) sulfonium hexafluorophosphate, tris(4-methylphenyl)sulfonium tetrakis(pentafluorophenyl) borate, and tris(4-methylphenyl)sulfonium special phosphorus-based anion salts.

For the cationic polymerization initiator, a commercial one may be used. Examples thereof may include San-Aid SI series manufactured by SANSHIN CHEMICAL INDUSTRY CO., LTD., WPI series manufactured by Wako Pure Chemical Industries, Ltd., SP series manufactured by ADEKA CORPORATION, and CPI series manufactured by San-Apro Ltd.

The content of the photopolymerization initiator, the component (B), is in the range of 0.1 to 5.0% by mass, preferably in the range of 0.5 to 5.0% by mass, in the composition for optical stereolithography whether the photopolymerization initiator is a radical polymerization initiator or a cationic polymerization initiator. When the content is less than 0.1% by mass, the radical polymerization reaction of the composition for optical stereolithography is slow. When the content is more than 5.0% by mass, the curing characteristics of the composition for optical stereolithography decrease.

The component (C) is a sensitizer, and is not particularly limited as long as it is a compound that can increase the light sensitivity of the composition for optical stereolithography (preferably a compound that absorbs wavelengths of 300 to 500 nm). A polyfunctional thiol compound is preferred.

Specific examples of the polyfunctional thiol compound include 1,3,5-tris(3-mercaptobutyryloxyethyl)-1,3,5-triazine-2,4,6(1H,3H,5H)-trione, 1,4-bis(3-mercaptobutyryloxy) butane, pentaerythritol tetrakis(3-mercaptobutyrate), trimethylolpropane tris(3-mercaptopropionate), tris[(3-mercaptopropionyloxy)-ethyl]-isocyanurate, and pentaerythritol tetrakis(3-mercaptopropionate).

The polyfunctional thiol compound as the sensitizer, the component (C), may be synthesized by a known method, and in addition, a commercial one may be used. Examples thereof include QX40 manufactured by Mitsubishi Chemical Corporation. ADEKA HARDENER EH-317 manufactured by ADEKA CORPORATION, PEMP, TBMPIC, and TMPMP manufactured by SC Organic Chemical Co., Ltd., and KarenzMT series manufactured by Showa Denko K.K.

Specific examples of a sensitizer other than a polyfunctional thiol compound include benzophenone. Examples of an acridine-based sensitizer include 9-phenylacridine, 9-(P-methylphenyl)acridine, 9-(o-methylphenyl)acridine, 9-(o-chlorophenyl)acridine, and 9-(o-fluorophenyl)acridine, or examples of a coumarin-based sensitizer include 7,7-(diethylamino)(3,3-carbonylbiscoumarin), 3-benzoyl-7-diethylaminocoumarin, and 7,7-bis(methoxy)(3,3-carbonylbiscoumarin). Examples of an anthracene-based sensitizer include 9,10-dimethoxyanthracene, 9,10-diethoxyanthracene, 9,10-dibutoxyanthracene, 9,10-bis(octanoyloxy)anthracene, 2,4-diethylthioxanthone, ethyl 4-(dimethylamino)benzoate, curcumin, diphenyl(2,4,6-trimethylbenzoyl)phosphine oxide, 2-ethylanthraquinone, and 2-isopropylthioxanthone. Examples of a naphthalene derivative-based sensitizer include 1-naphthol, 1-methoxynaphthalene, 1-ethoxynaphthalene, 1-n-propoxynaphthalene, 1-i-propoxynaphthalene, 1-n-butoxynaphthalene, 1-n-hexyloxynaphthalene, 1-benzyloxynaphthalene, 1-allyloxynaphthalene, 1-(2-hydroxyethoxy)naphthalene, 1-(2-methoxyethoxy)naphthalene, 1-(2-ethoxyethoxy)naphthalene, 2-naphthol, 2-methoxynaphthalene, 2-ethoxynaphthalene, 2-n-propoxynaphthalene, 2-2-propoxynaphthalene, 2-n-butoxynaphthalene, 2-n-(hexyloxy)naphthalene, 2-benzyloxynaphthalene, 2-(allyloxy)naphthalene, 2-(2-hydroxyethoxy)naphthalene, 2-(2-methoxyethoxy) naphthalene, 2-(2-ethoxyethoxy)naphthalene, and 1,4-diethoxynaphthalene.

The content of the sensitizer, the component (C), is in the range of 0.1 to 5.0% by mass, preferably in the range of 3.0 to 5.0% by mass, in the composition for optical stereolithography. When the content is less than 0.1% by mass, the composition for optical stereolithography does not photocure, and the sensitivity decreases extremely. When the content is more than 5.0% by mass, the sensitivity decreases locally, and the composition for optical stereolithography cures only in the portion of the surface. By adding the sensitizer, the component (C), to the composition for optical stereolithography, the reaction of photocuring can be further promoted to cure (bond) all polymerization components in the composition to obtain sufficient mechanical strength and heat resistance when a stereolithographic object is formed.

The composition for optical stereolithography may contain, as other components, a solvent for dissolving or dispersing the sensitizer, the component (C), a curing accelerator, a sensitization aid for the sensitizer, a polymerization inhibitor, an ultraviolet absorbing agent, a fluorescent brightening agent, a colorant (a dye, an organic pigment, an inorganic pigment), a luminescent agent, luminous agent particles, organic polymer particles, cellulosic particles, metal particles, an electrically conductive filler, a photocationically polymerizable curing component, a biodegradable plastic, a biomass plastic, starch, a diallyl phthalate-based polymer, a diallylcycloalkane-based polymer, and the like within a range that does not adversely affect the characteristics of the composition for optical stereolithography. The content of other components is not particularly limited and may be appropriately adjusted by those skilled in the art.

The stereolithographic object of the embodiment comprises a cured product of the above-described composition for optical stereolithography. The stereolithographic object can be applied to a wide range of fields. Specific examples of applications may include, but are not particularly limited to, precision parts, electrical and electronic parts, building structures, parts for automobiles, dies, matrices, medical fixtures such as plaster casts, mouthpieces for fixing teeth, dental plastic shaped objects, medical plastic appliances, and automobile parts.

The method for producing a stereolithographic object in the embodiment comprises at least the step of irradiating the above-described composition for optical stereolithography with an active energy ray to cure the composition for optical stereolithography, and can be performed using a conventional optical stereolithography method and optical stereolithography apparatus.

For example, when the method comprises (a) the step of selectively irradiating the surface of the composition for optical stereolithography with an active energy ray, based on contour line data made by slicing shape data input by three-dimensional CAD into a number of layers of thin cross sections, thereby forming a cured layer. (b) the step of further supplying the composition for optical stereolithography on the cured layer, (c) the step of performing the stacking operation of selective irradiation with an active energy ray as in the step (a) to newly form a cured layer continuous with the above-described cured layer, and (d) the step of repeating this stacking operation, a desired stereolithographic object can be provided. The thickness of a single layer or a stacked cured layer may be, for example, 20 to 200 sm. As the thickness of the cured layer is decreased, the shaping accuracy is increased, but the time and cost needed for production increase. Therefore, the thickness of the cured layer may be appropriately adjusted considering the balance between these.

Examples of the stereolithography apparatus used for the production of a stereolithographic object including a cured product of the composition for optical stereolithography may include, but are not particularly limited to, three-dimensional additive fabrication devices such as ATOMm-4000 (manufactured by CMET Inc.), DigitalWaX (registered trademark) 020X (manufactured by Sea Force Co., Ltd.), and ACCULAS (registered trademark) BA-85S (manufactured by D-MEC Ltd.).

The active energy ray with which the composition for optical stereolithography is irradiated is, for example, ultraviolet rays, visible light, radiation, X rays, an electron beam, or the like, preferably ultraviolet rays or visible light. The wavelength of ultraviolet rays or visible light is preferably 300 to 500 nm. Examples of the light source of ultraviolet rays or visible light include, but are not limited to, a semiconductor-pumped solid-state laser, a carbon arc lamp, a mercury lamp, a metal halide lamp, a xenon lamp, a chemical lamp, and a white LED. In particular, a laser is preferably used from the viewpoint of shaping accuracy, curability, and the like.

After the completion of the stacking operation, in order to remove the uncured composition for optical stereolithography adhering to the obtained stereolithographic object and the stereolithographic apparatus, the stereolithographic object and the stereolithographic apparatus are preferably washed. For the washing, water or a mixture obtained by mixing water with a surfactant, a disinfectant, an antiseptic, an alcohol, and/or the like may be used. After the washing, postcuring may be performed by irradiation with an active energy ray such as ultraviolet light or visible light or heating as needed.

The stereolithographic object is a stereolithographic object comprising a cured product of the above-described composition for optical stereolithography, preferably a stereolithographic object obtained by stacking cured layers formed by curing the composition for optical stereolithography. The stereolithographic object is produced, for example, by the above-described method for producing a stereolithographic object. In the stereolithographic object, the cured layer films adhere closely to each other, and therefore the warp deformation decreases, and furthermore, the adhesion between the layers is good, and therefore, a stereolithographic object having high strength (for example, bending strength, tensile strength, bending modulus, and repeated bending strength) can be obtained.

EXAMPLES

The present invention will be specifically described below by giving Examples, Reference Examples, and Comparative Examples, but the present invention is not limited to the following Examples.

Reference Examples 1 to 12, Examples 1 to 3, and Comparative Examples 1 to 4: Preparation of Compositions for Optical Stereolithography The compositions for optical stereolithography of Reference Examples 1 to 12, Examples 1 to 3, and Comparative Examples 1 to 4 were prepared by the following procedure. All components were charged into a stirred container according to the parts by weight of a composition shown in Table 1, and stirred at 20 to 40° C. for 2 hours to obtain a liquid composition. This liquid composition was filtered through a 10 micron filter bag (PO-10-PO3A-503, manufactured by Xinxiang D. King Industry) to remove foreign materials, was allowed to stand overnight, and then degassed to obtain a transparent liquid composition. When several ml of each of the prepared compositions for optical stereolithography was taken and placed on a base, and isopropyl alcohol was poured, all were easily washed away.

TABLE 1

| | Component A | | | | | Component B | Component C | |
|---|---|---|---|---|---|---|---|---|
| | A1 | A2 | A3 | A4 | A4 | | | |
| | KAYARAD R-604 | NK OLIGO UA-122P | NK OLIGO UA-160TM | ARONIX M-306 | LIGHT ACRYLATE 4EG-A | IRGACURE 907 | Karenz MTNR1 | Total of parts by weight |
| Example 1 | 25 | 20 | 20 | 35 | | 2 | 1 | 103 |
| Example 2 | 20 | 35 | 5 | 40 | | 2 | 1 | 103 |
| Example 3 | 20 | 25 | 25 | 20 | 10 | 2 | 1 | 103 |
| Example 4 | 30 | 20 | 20 | 30 | | 2 | 1 | 103 |
| Example 5 | 5 | 40 | 10 | 30 | 15 | 2 | 1 | 103 |
| Example 6 | 40 | 5 | 40 | 5 | 10 | 2 | 1 | 103 |
| Comparative Example 1 | 20 | | 40 | 40 | | 2 | 1 | 103 |
| Comparative Example 2 | 20 | 40 | | 40 | | 2 | 1 | 103 |
| Comparative Example 3 | | 20 | 20 | 50 | 10 | 2 | 1 | 103 |
| Comparative Example 4 | 40 | | | 50 | 10 | 2 | 1 | 103 |
| Comparative Example 5 | 30 | 50 | 20 | | | 2 | 1 | 103 |
| Comparative Example 6 | 50 | 20 | 20 | 10 | | 2 | 1 | 103 |
| Comparative Example 7 | 15 | 10 | 50 | | 25 | 2 | 1 | 103 |
| Comparative Example 8 | 30 | 50 | 5 | 5 | 10 | 2 | 1 | 103 |
| Comparative Example 9 | 3 | 40 | 3 | 54 | | 2 | 1 | 103 |

The details of the components in Table 1 are shown below.

KAYARAD R-604: dioxane glycol diacrylate, component (A1), viscosity 200 to 400 mPa-s (25° C.), acid value <1.0, manufactured by Nippon Kayaku Co., Ltd.

NK OLIGO UA-122P: polyester-based urethane acrylate, component (A2), viscosity 45000 mPa-s (40° C.), molecular weight 1100, manufactured by Shin Nakamura Chemical Co., Ltd.

NK OLIGO UA-160™: polyether-based urethane acrylate, component (A3), viscosity 2500 mPa-s (40° C.), molecular weight 1600, manufactured by Shin Nakamura Chemical Co., Ltd.

ARONIX M-306: mixture of pentaerythritol tri- and tetraacrylate (tri-form 65 to 70%) that is radical polymerizable compound, component (A4), viscosity 400 to 650 mPa-s/25° C., manufactured by TOAGOSEI CO., LTD.

LIGHT ACRYLATE 4EG-A: PEG400 #diacrylate (ethylene oxide 4-mol adduct) that is radical polymerizable compound, component (A4), viscosity 10 to 12 mPa·s/25° C., manufactured by Kyoeisha Chemical Co., Ltd.

IRGACURE 907: 2-methyl-1-(4-methylthiophenyl)-2-morpholinopropan-1-one that is photopolymerization initiator, component (B), manufactured by BASF KarenzMTNR1: 1,3,5-tris(3-mercaptobutyryloxyethyl)-1,3,5-triazine-2,4,6-(1H,3H,5H)-trione that is sensitizer, component (C), manufactured by Showa Denko K.K.

Fabrication of Evaluation Samples A

In order to evaluate the curing time of the compositions for optical stereolithography, samples were fabricated by the following procedure. The composition for optical stereolithography of Example 1 was poured into a handmade polyethylene rectangular mold (about 10 mm wide×100 mm long×, 5 mm deep) so as to form a 1 mm liquid film, and irradiated by 3-kw high pressure mercury lamp (wavelength 365 nm, distance 1 m) for 5 seconds, 10 seconds, 15 seconds, 20 seconds, 25 seconds, and 30 seconds to obtain evaluation samples A. Also, for the compositions for optical stereolithography of Examples 2 to 12 and Comparative Examples 1 to 4, evaluation samples A were obtained in the same manner.

Fabrication of Evaluation Samples B

In order to evaluate the curing time of the compositions for optical stereolithography, samples were fabricated by the following procedure. The composition for optical stereolithography of Example 1 was poured into a handmade polyethylene rectangular mold (about 10 mm wide×100 mm long×, 5 mm deep) so as to form a 1 mm liquid film, and irradiated by a 3-kw high pressure mercury lamp (wavelength 365 nm, distance 1 m) for 20 seconds. This was repeated a total of four times to make a flat plate about 4 mm thick (about 10 mm wide×100 mm long). Furthermore, the flat plate was re-irradiated for 30 minutes to obtain the evaluation sample B that was an optically stereolithographic object. Also, for the compositions for optical stereolithography of Examples 2 to 12 and Comparative Examples 1 to 4, evaluation samples B were obtained in the same manner.

Evaluation Methods

1. Evaluation of Curing Time of Composition for Optical Stereolithography

The evaluation samples A were used, and from the sample with short irradiation time, the surface state was observed. The irradiation time according to the evaluation sample A without the tack of the surface was taken as the curing time. For "the presence or absence of the tack of the surface", the evaluation sample A was placed in an oven, treated at 35° C. for 30 minutes, and cooled to room temperature (25° C.), and then a polyester film was pressed against the surface of the evaluation sample A by hand. When the polyester film did not peel easily, it was determined that the surface had tack. When the polyester film peeled, it was determined that the surface had no tack. The curing time of the evaluation sample A is shown in Table 2.

2. Observation of Layers (Side Surface) of Optically Stereolithographic Object

The evaluation sample B was used, and the layers (side surface) of the flat plate were observed by a JEOL model JSM-5600 scanning electron microscope (acceleration voltage 7 kv, magnification 200×). For the criteria of evaluation, a case in which there was a gap between the layers was considered as ("x"), and a case in which there was no gap between the layers was considered as ("○"). The results are shown in Table 2.

3. Observation of Warp Deformation of Optically Stereolithographic Object

The flat plate of the evaluation sample B was placed on a flat base, and the distance at which its end floated from the flat base was measured. For the criteria of determination, a case in which the floating distance was 2 mm or more was considered as ("x"), a case in which the end floated at a floating distance of 2 mm or less was considered as ("Δ"), and a case in which the floating distance was 0 mm, that is, the end did not float, was considered as ("○"). The results are shown in Table 2.

4. Tensile Test

For the flat plate of the evaluation sample B, tensile strength and elongation were measured in accordance with ISO527-1 under the following measurement conditions. The elongation was measured as the maximum elongation rate at breakage. The results are shown in Table 2.

Measuring apparatus: model 3366 universal testing machine manufactured by Instron
Tensile speed (crosshead speed): 5 mm/min
Measurement environment: temperature 25° C., humidity 45% RH
Gauge length: 80 mm 5. Three-Point Bending Test The three-point bending test of the flat plate of the evaluation sample B was performed in accordance with ISO527-1 under the following measurement conditions to measure bending strength and bending modulus. The results are shown in Table 2.

Measuring apparatus: model 3366 universal testing machine manufactured by Instron
Test conditions: three-point bending test jig indenter radius 5 mm
span 64 mm
load speed (crosshead speed) 2 mm/min
Measurement environment: temperature 25° C. humidity 45% RH 6. Bare Drop Test For the evaluation sample B, a bare drop test was performed under the following measurement conditions, and the presence or absence of a fracture was visually observed, and drop fracture observation was performed. The results are shown in Table 2.

Drop floor surface: marble floor tile
Drop height: 3 m
Weight of sample: 14.5 g
Drop angle of sample: 60 degrees to marble floor tile surface For the criteria of determination, five samples were dropped, and the number of samples with a fracture including a crack was recorded.

7. Repeated Folding Test

Ten millimeters of an end of the evaluation sample B was held and fixed by a vise. The other end of the evaluation sample B was held by pliers, and the evaluation sample B was folded to the left and to the right ten times. After the test, the appearance of the folded part is visually observed. The criteria of determination were ○: no change, Δ: color change to white, ▲: a crack, and x: fractured.

The evaluation, observation, and test results of the above-described 1 to 7 are shown in Table 2. It was found that for the compositions for optical stereolithography of Examples 1 to 6 in which all the radical polymerizable compounds of four components, the component (A1), the component (A2), the component (A3), and the component (A4), were used as the component (A), the curing time was 4 to 5 seconds, and therefore, the curing time was the same as the curing time of the Comparative Examples. However, for the blends of Examples 1 to 6, no warp deformation was observed, the tensile strength, the elongation, the bending strength and modulus, and the repeated bending strength were excellent, and drop fracture was hardly observed.

TABLE 2

| | Evaluation sample A Curing time (seconds) | Evaluation sample B | | | | | | | |
|---|---|---|---|---|---|---|---|---|---|
| | | Layers (side surface) | Warp deformation | Tensile strength (Mpa) | Tensile elongation (%) | Bending strength (Mpa) | Bending modulus (Mpa) | Drop fracture observation (number) | Repeated folding test |
| Example 1 | 5 | ○ | ○ | 130 | 68 | 97 | 2150 | 0 | ○ |
| Example 2 | 4 | ○ | ○ | 136 | 66 | 91 | 2210 | 0 | ○ |
| Example 3 | 5 | ○ | ○ | 121 | 70 | 99 | 2190 | 0 | ○ |
| Example 4 | 5 | ○ | ○ | 149 | 61 | 98 | 2188 | 1 | ○ |
| Example 5 | 4 | ○ | ○ | 141 | 67 | 99 | 2199 | 0 | ○ |
| Example 6 | 5 | ○ | ○ | 140 | 66 | 96 | 2201 | 0 | ○ |
| Comparative Example 1 | 5 | ○ | ○ | 60 | 8 | 61 | 1620 | 5 | x |
| Comparative Example 2 | 4 | ○ | ○ | 65 | 10 | 60 | 1628 | 4 | x |
| Comparative Example 3 | 6 | ○ | ○ | 64 | 8 | 58 | 1631 | 5 | x |
| Comparative Example 4 | 5 | ○ | ○ | 69 | 7 | 58 | 1621 | 5 | x |
| Comparative Example 5 | 5 | ○ | ○ | 53 | 9 | 60 | 1618 | 4 | x |
| Comparative Example 6 | 5 | ○ | ○ | 59 | 7 | 62 | 1627 | 5 | x |
| Comparative Example 7 | 5 | ○ | ○ | 60 | 6 | 63 | 1625 | 5 | x |

TABLE 2-continued

| | Evaluation sample A Curing time (seconds) | Layers (side surface) | Warp deformation | Tensile strength (Mpa) | Tensile elongation (%) | Bending strength (Mpa) | Bending modulus (Mpa) | Drop fracture observation (number) | Repeated folding test |
|---|---|---|---|---|---|---|---|---|---|
| | | | | | Evaluation sample B | | | | |
| Comparative Example 8 | 5 | ○ | ○ | 78 | 6 | 60 | 1619 | 5 | x |
| Comparative Example 9 | 4 | ○ | ○ | 71 | 9 | 55 | 1625 | 5 | x |

The invention claimed is:

1. A composition for optical stereolithography, comprising at least:
   (A1) a radical polymerizable compound of a dioxane (meth)acrylate,
   (A2) a radical polymerizable compound of a bifunctional polyester-based urethane (meth)acrylate,
   (A3) a radical polymerizable compound of a bifunctional polyether-based urethane (meth)acrylate, and
   (A4) a radical polymerizable compound other than the (A1), (A2), and (A3),
   as (A) radical polymerizable compounds;
   (B) a photopolymerization initiator; and
   (C) a sensitizer,
   wherein a content of the (A1) radical polymerizable compound is 2 to 40% by mass,
   a content of the (A2) radical polymerizable compound is 5 to 40% by mass,
   a content of the (A3) radical polymerizable compound is 5 to 40% by mass,
   a content of the (A4) radical polymerizable compound is 20 to 87% by weight,
   a content of the (B) photopolymerization initiator is 0.1 to 5% by mass, and
   a content of the (C) sensitizer is 0.1 to 5% by mass.

2. A method for producing a stereolithographic object, comprising a step of irradiating the composition for optical stereolithography according to claim 1 with an active energy ray to cure the composition for optical stereolithography.

3. A stereolithographic object comprising a cured product of the composition for optical stereolithography according to claim 1.

* * * * *

UNITED STATES PATENT AND TRADEMARK OFFICE
CERTIFICATE OF CORRECTION

PATENT NO. : 11,840,015 B2
APPLICATION NO. : 16/972438
DATED : December 12, 2023
INVENTOR(S) : Okamoto et al.

It is certified that error appears in the above-identified patent and that said Letters Patent is hereby corrected as shown below:

On the Title Page

Item [56]: Please correct "JP 2013514213 4" to read --JP 2013514213 A--

In the Specification

Column 3, Line 56: Please correct "(At)" to read --(A1)--

Column 7, Line 47: Please correct "c0" to read --c10--

Column 9, Line 57: Please correct "200 sm" to read --200 μm--

Column 11, Line 47: Please correct "PEG400 #diacrylate" to read --PEG400# diacrylate--

Signed and Sealed this
Twenty-sixth Day of March, 2024

Katherine Kelly Vidal
*Director of the United States Patent and Trademark Office*